United States Patent [19]

Ward

[11] Patent Number: 4,818,844
[45] Date of Patent: Apr. 4, 1989

[54] FURNACE HEATING

[75] Inventor: Trevor Ward, Rudland, Great Britain

[73] Assignee: Hotwork Development Limited, Dewsbury, United Kingdom

[21] Appl. No.: 939,041

[22] PCT Filed: Mar. 24, 1986

[86] PCT No.: PCT/GB86/00170
§ 371 Date: Jan. 8, 1987
§ 102(e) Date: Jan. 8, 1987

[87] PCT Pub. No.: WO86/05865
PCT Pub. Date: Oct. 9, 1986

[30] Foreign Application Priority Data

Mar. 27, 1985 [GB] United Kingdom ............... 8507993

[51] Int. Cl.⁴ .............................................. F27D 11/00
[52] U.S. Cl. ................................... 219/279; 219/369; 219/374; 219/365; 432/94; 266/139
[58] Field of Search ................ 219/279, 121 P, 280, 219/325, 365, 359, 364, 369, 374; 432/214, 94; 266/139, 214, 217

[56] References Cited

U.S. PATENT DOCUMENTS

| 2,172,105 | 9/1939 | Parker | 432/20 |
| 3,345,054 | 10/1967 | Andonjev et al. | 432/20 |
| 4,141,408 | 2/1979 | Garnett | 219/279 |
| 4,401,101 | 8/1983 | Lunde | 219/279 |
| 4,434,004 | 2/1984 | Ratschat | 266/139 |
| 4,532,413 | 7/1985 | Ahonen | 219/279 |

FOREIGN PATENT DOCUMENTS

| 0119786 | 5/1979 | European Pat. Off. . |
| 0019007 | 9/1984 | European Pat. Off. . |
| 298292 | 6/1915 | Fed. Rep. of Germany . |
| 1758790 | 2/1971 | Fed. Rep. of Germany . |
| 2944818 | 5/1980 | Fed. Rep. of Germany . |
| 2056040 | 3/1981 | United Kingdom . |

Primary Examiner—M. H. Paschall
Attorney, Agent, or Firm—Felfe & Lynch

[57] ABSTRACT

A burner is mounted on top of a regenerator by a pipe connector.

The combustion chamber of the burner communicates with the furnace interior via a tunnel and with the interior of the regenerator comprises a packing of ceramic material with a tubular casing of ceramic fibers. An electrical heating element is mounted in the pipe connector or is situated near the top of the packing.

17 Claims, 3 Drawing Sheets

FURNACE HEATING

DESCRIPTION

This invention relates to a furnace heating arrangement which incorporates a regenerative arrangement.

Regenerative arrangements are known for preheating combustion air for a burner, in which exhaust (or flue gases) and air are passed alternately through a heat rententive matrix. The conventional regenerative arrangement is for the flue gases to be exhausted from the interior of the furnace and for the preheated combustion air to be fed into the interior of the furnace separately from the fuel or combustible air/fuel mixture so that the flame is formed within the furnace interior. DE-PS-298292; GB-A-2056040 and EP-A-0019007 disclose such an arrangement and the latter reference also discloses the use of electrical heating in a melting furnace as a supplement to the heating due to combustion of fuel in the furnace interior, the electrodes being immersed in the melt.

U.S. Pat. No.-A-3345054 and DE-A-1758790 disclose basically similar arrangements for heating an open hearth furnace in which a separate flue path is provided for exhausting hot gases from the furnace interior through a regenerative matrix but the reverse flow of fresh combustion air is diverted, after passage through the matrix, and is fed to a burner to support the formation of a high and luminous flame which is directed into the open hearth furnace by the burner.

DE-A-2944818 discloses a self-recuperation system which differs from a regenerative arrangement in that the fresh combustion air is supplied continuously and is continuously preheated by heat exchange with a stream of hot gases within a matrix incorporated in the burner, the stream of hot gases being exhausted from the furnace continuously through the burner. The heat exchanger of the burner disclosed by this reference is formed of a ceramic material.

Another form of regenerative arrangement which is known for heating a furnace comprises two burners, each with its own regenerative arrangement, and a common changeover valve operable to connect each burner, through its own regenerative arrangement to a respective one of a forced supply of fresh air, and means for drawing exhaust gases from the interior of the furnace, through the respective burner and regenerative arrangement. Hence one of the burners is fired using air fed to it via its regenerative arrangement so that it is heated, that burner directing a stream of products of combustion into the furnace interior, while the other burner serves as an waste flue for the furnace products of combusion within the interior of the furnace being drawn through the other burner and the respective regenerative arrangement so that the latter is heated. The burners and the regenerative arrangements are formed so that all their working surfaces are ceramic. EP-A-0119786 discloses a burner for use in such a regenerative arrangement.

According to this invention there is provided a furnace heating arrangement comprising a heat retentive matrix and means operable alternately to cause a hot exhaust stream from the furnace to be passed through the matrix whereby the matrix is heated, and to cause an induction stream to be passed through the matrix to the furnace such that it is heated by heat retained in the matrix, wherein the matrix is associated with an electrical heating element which is operable to heat a stream which is passed through the matrix. The induction stream may be fresh air or recirculated furnace atmosphere.

The furnace heating arrangement operates so that heat output from the electrical heating element is distributed to and within the matrix, is collected within the matrix on exhaustion from the furnace and is transferred to the furnace subsequently. The complex heating element structures normally used to distribute heat within electric furnaces need not be used in a furnace heating arrangement in which this invention is embodied.

The matrix and the interior of the furnace may communicate with each other through a tunnel formed within a respective burner. Operation of the burner and the electrical heating element may be controlled so that they operate alternately to heat a stream which is passed through the matrix. Conveniently the matrix is a packing of ceramic material packed within a tubular casing which may be formed of ceramic fibres, and is close coupled to the burner which is a refractory lined high velocity burner.

The electrical heating element may be a resistance unit situated between the matrix and the burner tunnel or within the matrix. Alternatively the electrical heating element may be a conductor which is incorporated in the matrix, or plasma generating means or arc discharge means.

If the electrical heating element is switched on continuously during operation of the furnace heating arrangement, the matrix would be heated by it as well as by heat exhaused from the furnace as the exhaust stream is passed through the matrix. This would lead to very high burner flame temperatures when the flow through the matrix is reversed and the burner operated.

The furnace heating arrangement could be operated without the use of a fuel fired burner, electrical power being the only source of heat energy. Such an arrangement would be suitable where furnace protective atmospheres are the recirculating gases.

In a preferred embodiment of the invention, the furnace heating arrangement includes two or more such heat retentive matrixes, each of which communicates with the interior of the furnace through a tunnel formed in a respective burner or connector and each associated with its own electrical heating element, there being a common changeover valve or system operable to connect each matrix to a respective one of a combustion air supply fan and an exhaust fan or eductor, and control means responsive to time and the temperature of the emerging exhaust stream at the exhaust fan or eductor and operable to effect operation of the changeover valve or valves to reverse the connection of the fans to the matrixes.

Several embodiments of this invention are described now by way of example with reference to the accompanying drawings, of which:

Figure 1:
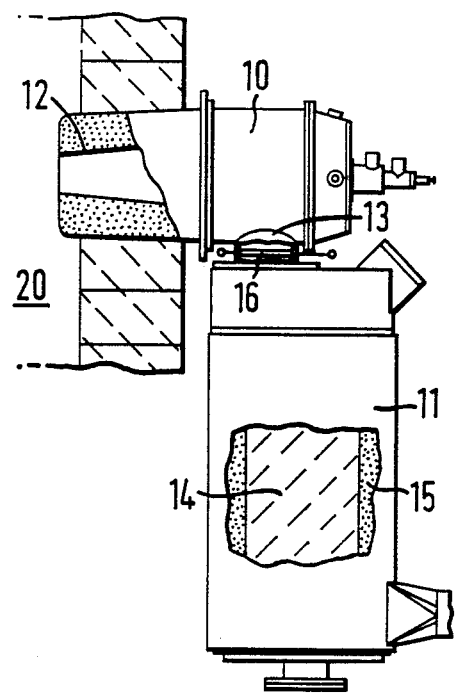
FIG. 1 is a partly sectioned view of a close-coupled high velocity refractory lined burner and ceramic matrix regenerator with an electrical heating element fitted between the burner and the regenerator.

FIG. 1 shows the burner 10 mounted on top of the regenerator 11. Coveniently the burner 10 is as is described and claimed in EP-A-0119786. Its combustion chamber (not shown) communicates with the interior of a furnace 20 which is to be heated, via a tunnel 12 which tapers towards the furnace 20, and with the interior of the regenerator 11 via a conduit (not shown) which is formed by a pipe connector 13 by which the burner 10 is mounted on the regenerator 11.

The regenerator 11 comprises a packing 14 of ceramic material within a tubular casing 15 which may be formed of ceramic fibres. The packing 14, which conveniently is loosely packed and is in the form of balls or pebbles, serves to store heat for subsequent release.

An electrical heating element 16 is mounted in the pipe connector 13 so that it extends across the conduit therein. Terminals are provided outside the connector 13 for connecting the heating element 16 into a suitable electrical power supply. The electrical heating element 16 is arranged so that it heats a stream which is passed through the pipe connector 13.

In operation, the apparatus shown in FIG. 1 alternates between two modes.

In one mode fresh air is fed through the packing 14 and the conduit of the pipe connector 13 to the combustion chamber of the burner 10, and the burner 10 is fired, combustion being supported by the fresh combustion air which has been preheated by heat exchange with the packing 14 as it passed through it. The hot products of combination within the burner 10 are directed as a high velocity stream into the furnace 20 through the tunnel 12.

In the other mode the burner 10 serves as a flue instead of being fired and the hot gases exhausted from the furnace 20 through it are passed through the conduit in the pipe connector 13 and through the packing 14 which is heated by them. The electrical heating element 16 is switched on so that the stream of gases exhausted from the furnace 20 is heated further. Hence the packing 14 is heated by the stream of exhaust gases passed through it to a greater extent than would be so if the heating element 16 was not switched on. Also the heat output from the heating element 16 is distributed within the packing 14 where 14 is collected by the packing 14 and stored for subsequent transfer into the furnace 20 with a flow of fresh combustion air.

Figure 2:
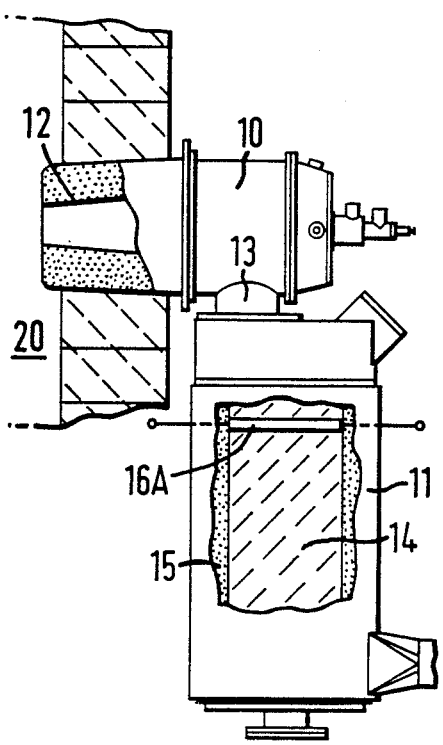
FIG. 2 is similar to FIG. 1 but shows the electrical heating element situated within the matrix.

FIG. 2 shows the electrical heating element 16A extending across and through the packing 14, near to the top of the regenerator 11 so that the bulk of the packing 14 is below it, instead of it being mounted in the pipe connector as in FIG. 1. The terminals are provided on the outside of the tubular casing 15.

The apparatus shown in FIG. 2 may be operated as has been described above for FIG. 1, but there will be a certain amount of direct heating of the packing 14 by the heating element 16A as well as heating of the stream of hot products exhausted through the packing 14 which serves to distribute heat output from the heating element 16A through the packing 14. However the electrical heating element 16A may be switched on continuously, and not just when the burner 10 is serving as a flue, in which case the packing 14 is heated by it in both modes of operation. This leads to very high burner flame temperatures.

Figure 3A:
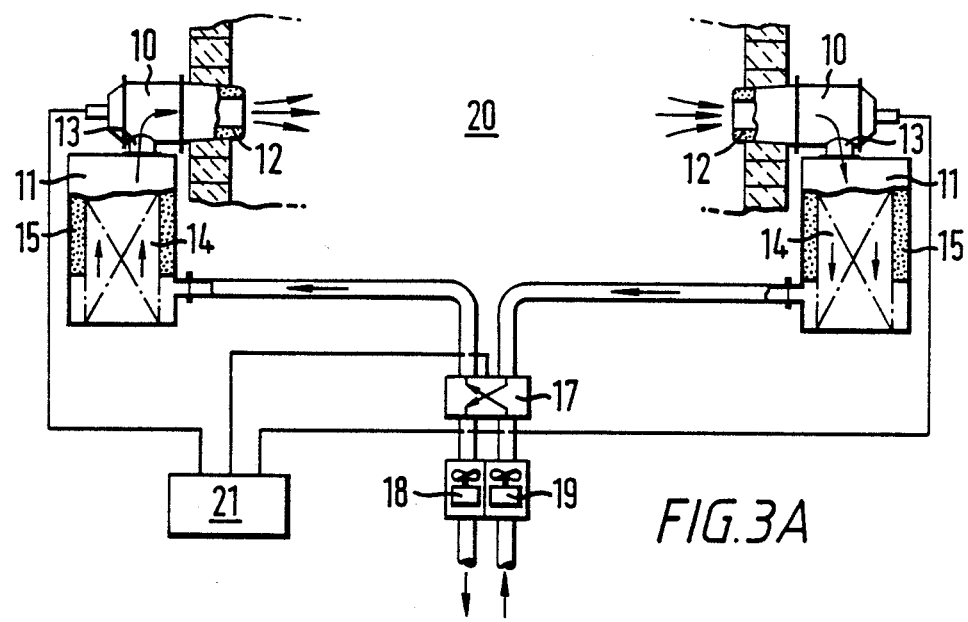
FIGS. 3A and 3B are diagrams illustrating the two modes of operation of two regenerative burners as shown in FIG. 1 or FIG. 2 to heat a furnace.
Figure 3B:
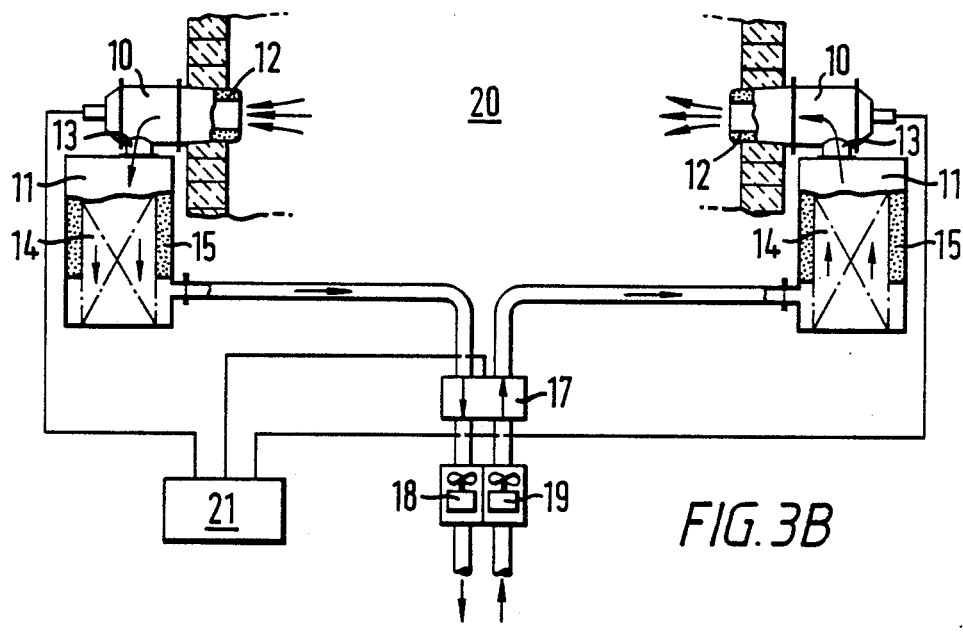

A furnace heating arrangement including apparatus as shown in FIG. 1 or FIG. 2 includes at least two sets of such apparatus. FIGS. 3A and 3B illustrate operation of such an arrangement which has just two sets, each having the combustion chamber of its burner 10 communicating with the interior of the furnace via its tunnel 12. A common changeover valve 17, which is provided outside the furnace 20, is operable to connect the end of each regenerator 11 remote from the pipe connector 13 to a respective one of a combustion air supply fan 18 and an exhaust fan 19. An eductor arrangement may beused in place of the exhaust fan. Alternating operation of the changeover valve 17 and of the burner 10 (including its fuel supply) is controlled by control means 21 which are responsive to various selected operational parameters of the system such as time and the temperature of the exhaust stream at the exhaust fan 19.

Figure 4:
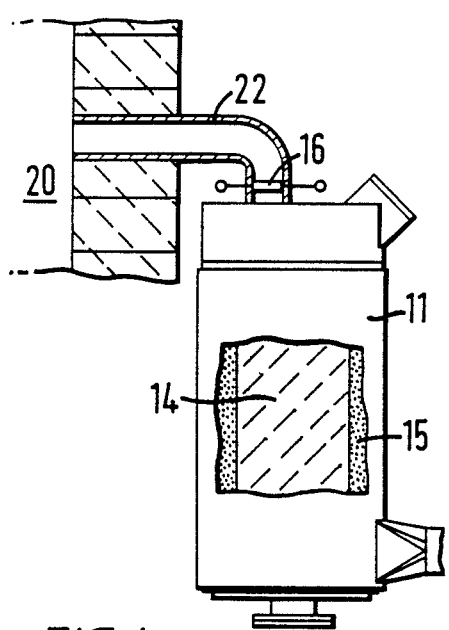
FIG. 4 is a diagram of a ceramic matrix regenerator with an electrical heating element fitted into a conduct which is provided for connecting the regenerator to the interior of a furnace.

FIG. 4 is a view, similar to FIG. 1, which illustrates regenerative furnace heating apparatus which includes a regenerative matrix 11 and an electrical heating element 16 in a pipe connection 22 by which the interior of the furnace 20 communicates with the regenerator packing 14. In this arrangement the sole heating is electrical, there being no fuel-fired burner provided.

Figure 5:
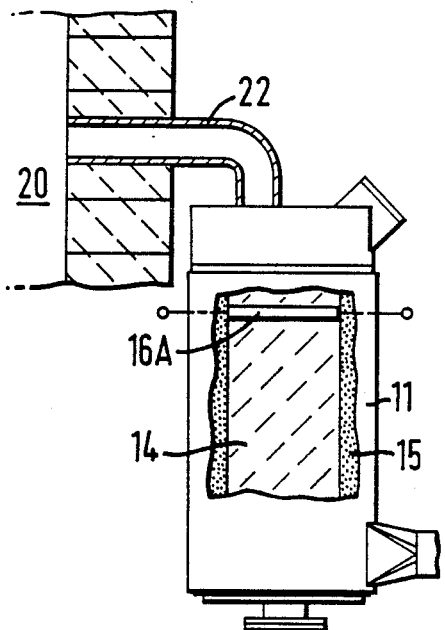
FIG. 5 is a diagram of a ceramic matrix regenerator with an electrical heating element fitted into it.

FIG. 5 is similar to FIG. 4 but shows the electrical heating element situated in the packing 14 as in FIG. 2.

Figure 6A:
FIGS. 6A-6D illustrate different forms of electrical heating element for use in the embodiments illustrating in FIGS. 1, 2, 4 and 5.
Figure 6B:
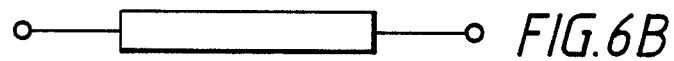
Figure 6C:
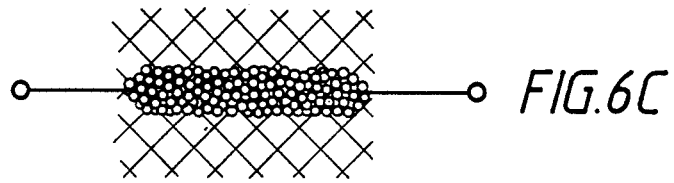
Figure 6D:

The electrical heating element 16, 16A may be a resistance unit as shown diagrammatically in FIG. 6A. An electrical conductor as shown diagrammatically in FIG. 6B, a layer of silicon particles which cooperated together to provide a path for electric current flow through the regenerator 11 as shown diagrammatically in FIG. 6C; or a plasma generator or an arc discharge device as shown diagrammatically in FIG. 6D.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. A furnace heating arrangement comprising: a heat retentive matrix; means operable to direct a hot exhaust stream from the furnace through the matrix whereby the matrix is heated, and alternately to cause a fluid induction stream to be passed through the matrix to the furnace such that said fluid induction stream is heated by heat retained in the matrix; and an electrical heating means associated with the matrix, said electrical heating means being operable to heat said exhaust stream and alternately said fluid induction stream which is passed through the matrix.

2. The furnace heating arrangement of claim 1, wherein the fluid induction stream is selected from the group consisting of fresh air or recirculated furnace atmosphere.

3. The furnace heating arrangement of claim 1, wherein the matrix and the interior of the furnace are in communication through a tunnel formed within a respective burner.

4. The furnace heating arrangement of claim 3, further comprising control means for operation of the burner and the electrical heating means so that they operate alternately to heat a stream which is passed through the matrix.

5. The furnace heating arrangement of claim 1, wherein operation of the electrical heating means is controlled continuously during operation of the furnace heating arrangement.

6. The furnace heating arrangement of claim 1, wherein the matrix is a packing of ceramic material packed within a tubular casing.

7. The furnace heating arrangement of claim 6, wherein the tubular casing is formed of ceramic fibers.

8. The furnace heating arrangement of claim 3, wherein the electrical heating means is situated between th matrix and the burner tunnel.

9. The furnace heating arrangement of claim 1, wherein the electrical heating means is situated within the matrix.

10. The furnace heating arrangement of claim 8, wherein the electrical heating means is a resistance unit, a conductor, plasma generating means or arc discharge means.

11. The furnace heating arrangement of claim 9, wherein the electrical heating means is a resistance unit, a conductor, plasma generating means or arc discharge means.

12. The furnace heating arrangement of claim 1, wherein electrical power is the sole source for supplying heat to the furnace heating arrangement.

13. The furnace heating arrangement of claim 1, including at least two such heat retentive matrixes, each of which communicates with the interior of the furnace through a respective tunnel formed in a respective burner or connector and each associated with its own electrical heating means.

14. The furnace arrangement of claim 13 further comprising changeover means operable to connect each matrix to a respective one of a combustion air supply fan and an exhaust flow inducing means.

15. The furnace arrangement of claim 14 further comprising control means responsive to time and the temperature of the emerging stream at the exhaust flow inducing means and operable to effect operation of the changeover means to reverse the connection of the fan and exhaust flow inducing means to the matrixes.

16. A furnace heating arrangement comprising:
   a burner, a tunnel formed through the burner; a heat retentive matrix; means placing the heat retentive matrix in fluid communication with the interior of the furnace through the tunnel; and means operable alternately to cause a hot exhaust stream from the furnace to be passed through the matrix whereby the matrix is heated, and to cause an induction stream to be passed through the matrix to the furnace such that it is heated by heat retained in the matrix; wherein the matrix is associated with an electrical heating means which is operable to heat such a stream that is passed through the matrix when the burner is not operable to heat that stream.

17. A heating arrangement comprising:
   a heat retentive matrix; means for passing a fluid stream through said matrix; and electrical heating means to heat said stream.

* * * * *

UNITED STATES PATENT AND TRADEMARK OFFICE
CERTIFICATE OF CORRECTION

PATENT NO. : 4,818,844
DATED : April 4, 1989
INVENTOR(S) : Trevor Ward

It is certified that error appears in the above-identified patent and that said Letters Patent is hereby corrected as shown below:

Column 1, line 53      "combusion" should be --combustion--

Column 2, line 31      "exhaused" should be --exhausted--
                       "exhust" should be --exhaust--

Column 3, line 51      "where 14" should read --where it--

Column 6, line 9       following "emerging", insert --exhaust--

Signed and Sealed this

Twenty-fifth Day of July, 1989

Attest:

DONALD J. QUIGG

*Attesting Officer*     Commissioner of Patents and Trademarks